United States Patent [19]
Wickenberg

[11] 3,981,625
[45] Sept. 21, 1976

[54] PUMP WITH GAUGE MEANS
[75] Inventor: Chester H. Wickenberg, Elgin, Ill.
[73] Assignee: Dahltron Corporation, Lombard, Ill.
[22] Filed: Apr. 24, 1975
[21] Appl. No.: 571,316

Related U.S. Application Data
[63] Continuation of Ser. No. 444,873, Feb. 22, 1974, abandoned.

[52] U.S. Cl. .................................. 417/63; 417/524; 417/526; 417/527; 417/566; 92/58.1; 73/146.3
[51] Int. Cl.² .................... F04B 21/00; F04B 21/04; B60C 23/02
[58] Field of Search ..................... 417/63, 524–527; 73/419, 146.2, 146.3, 146.8, 389; 285/302; 403/109

[56] References Cited
UNITED STATES PATENTS

| | | | |
|---|---|---|---|
| 544,998 | 8/1895 | Smith | 417/63 |
| 1,645,788 | 10/1927 | Boies | 73/419 |
| 1,762,625 | 6/1930 | Holt | 417/525 |
| 2,576,687 | 11/1951 | Krehbiel | 73/419 |
| 3,056,538 | 10/1962 | Owsen | 417/63 |
| 3,485,180 | 12/1969 | Wickenberg et al. | 417/526 |

Primary Examiner—William L. Freeh
Attorney, Agent, or Firm—Edward D. Gilhooly

[57] ABSTRACT

A pump having a hollow cylinder, and a piston slidably received in the cylinder, with the piston dividing the inside of the cylinder into two chambers. A hollow piston rod has one end connected to the piston and the other end extending out of the cylinder, and means is provided for attaching the other end of the piston rod to an inflatable member. The pump has one-way valve means adjacent each end of the cylinder to permit passage of air into each chamber, while preventing passage of air out of the chambers. Valve means is carried by the piston to establish communication between either of the chambers and the piston rod when the pressure in either chamber exceeds the pressure in the piston rod and inflatable member. The pump has opening means communicating between the piston rod and one of the chambers, in order that the pressure in the inflatable member is indicated by the location which the cylinder assumes relative the piston after movement of the piston to the end of the one chamber and release of the cylinder.

20 Claims, 10 Drawing Figures

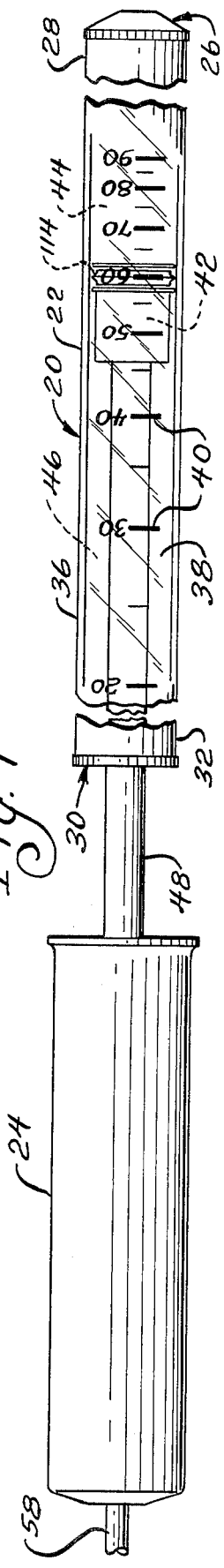
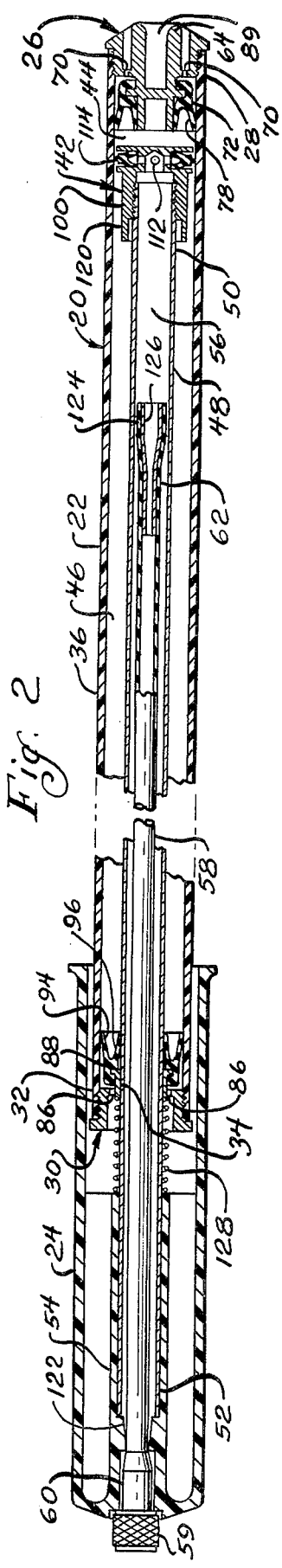
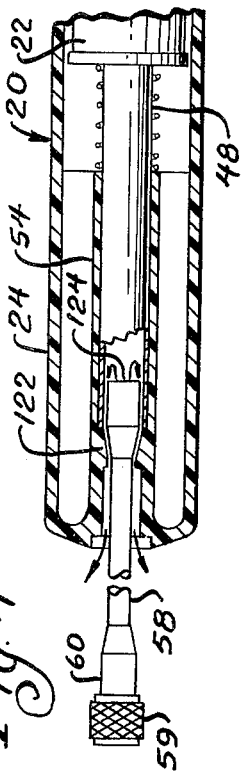
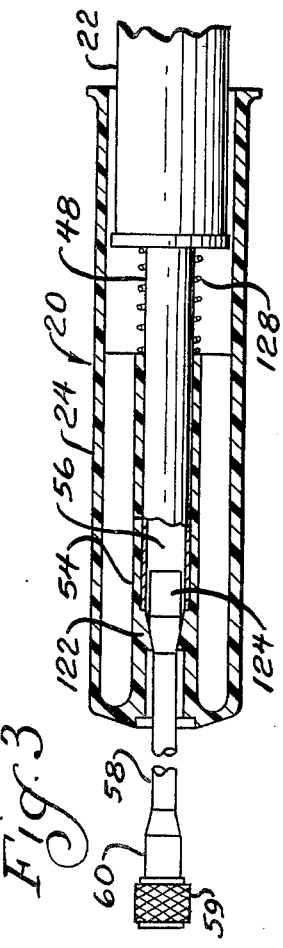

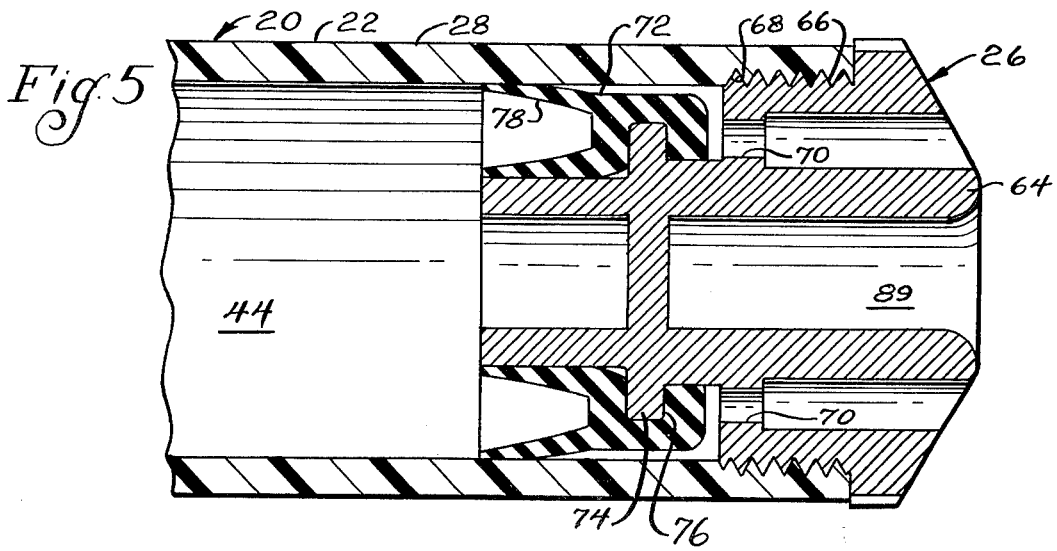
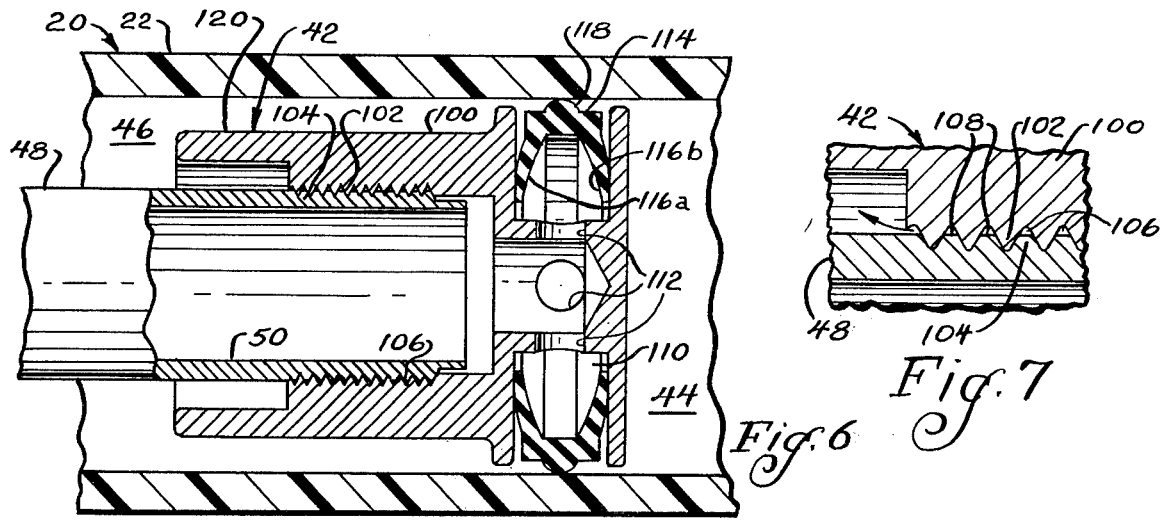
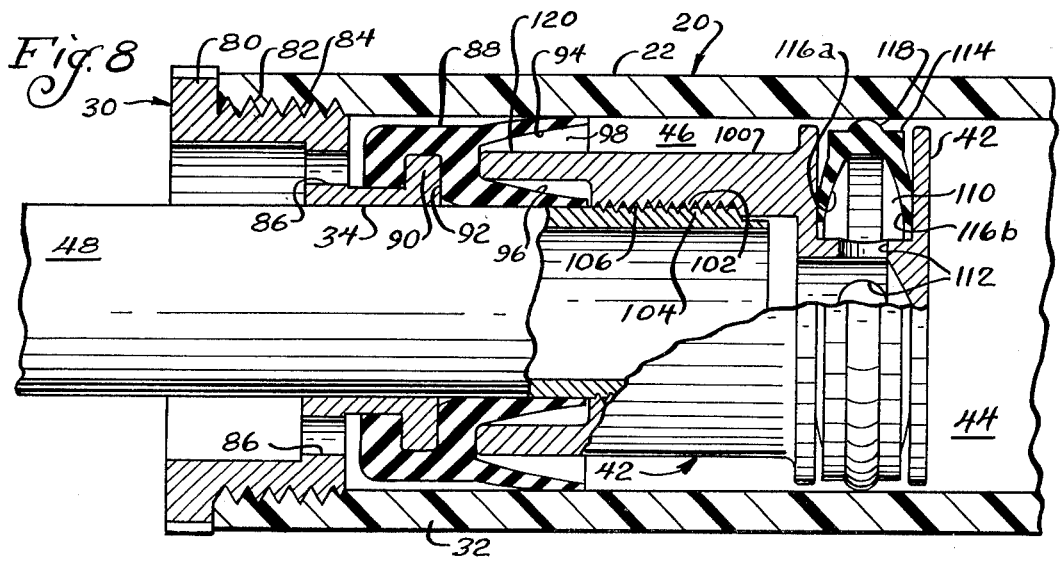

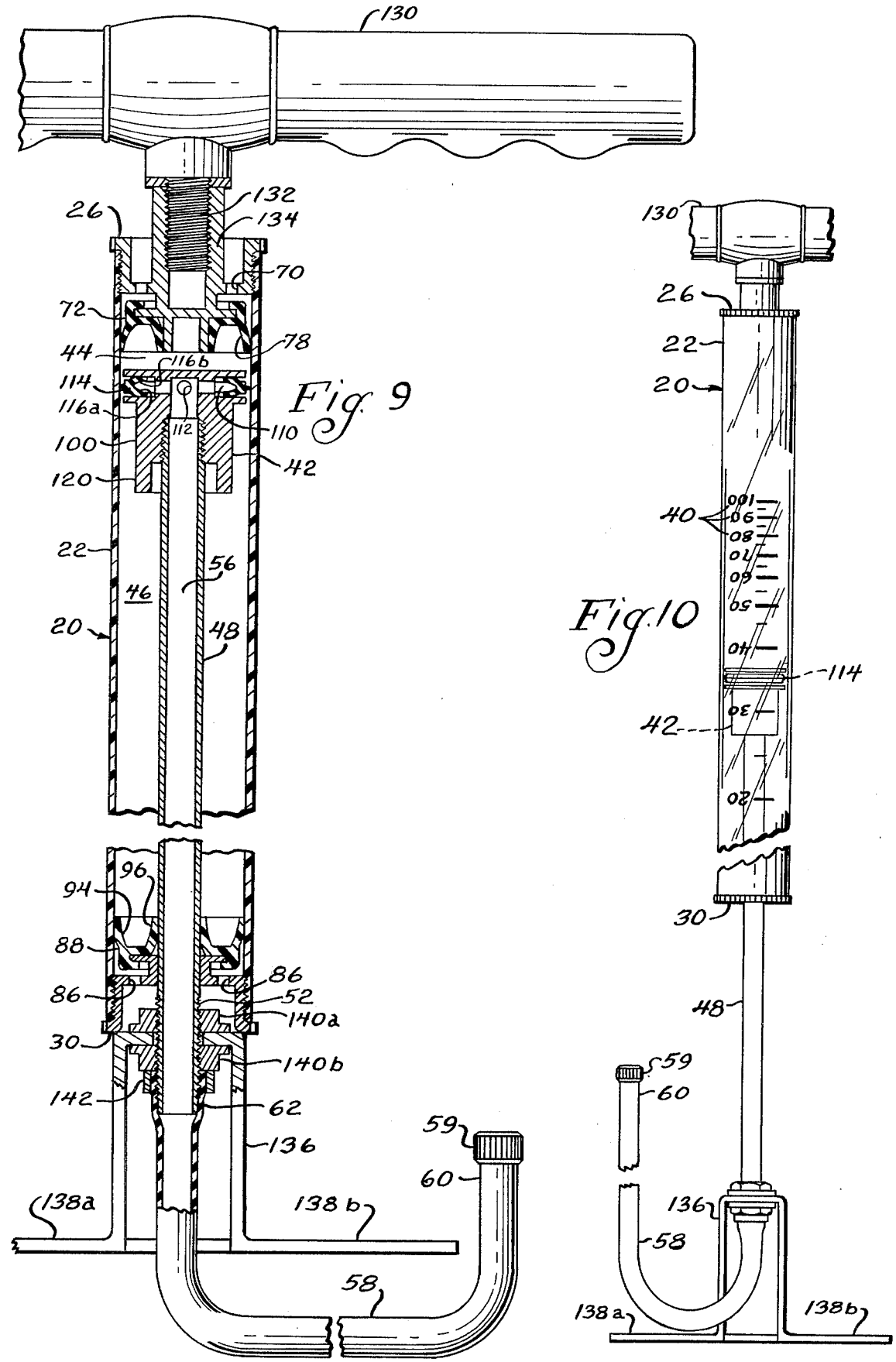

PUMP WITH GAUGE MEANS

This is a continuation of application Ser. No. 444,873, filed Feb. 22, 1974, now abandoned.

BACKGROUND OF THE INVENTION

1. Field of the invention.

The present invention relates to a pump for inflating an inflatable member, and more particularly to hand pumps.

2. Description of the prior art.

A various assortment of hand pumps have been proposed for use in inflating an inflatable member, such as a tire. Particularly when utilized to inflate a tire, such pumps are normally provided with a hose having an attachment at its outer end which is threaded onto a valve stem of the tire. Since tires have a recommended pressure at which they should be used, it is desirable to known the pressure in the tires as the pumping proceeds. Anyone who has inflated a tire with a hand pump is aware of the difficulty and inconvenience involved in obtaining the correct pressure in the inflated tire. First, the tire is inflated to an estimated pressure, after which the hose attachment is unthreaded from the valve stem, and the pressure must then be checked with a separate pressure gauge. If the pressure in the tire is insufficient, the hose is reattached to the stem, and the tire is inflated an additional amount, after which the hose is removed and the pressure is again checked with the gauge. This procedure may continue a number of times until the desired pressure is attained, during which the hose may be attached and removed a number of times to verify the pressure in the tire.

If the tire has been overinflated, a pin in the valve stem must be depressed or removed to deflate the tire somewhat, after which the pressure in the tire is again checked. If deflation of the tire is insufficient, an additional amount of air must be removed from the tire until the correct pressure is obtained. Thus, both inflation and deflation of the tire is attended by a considerable amount of inconvenience resulting from multiple attachments and removals of the hose, due to the necessity of removing the hose when the pressure is checked with a gauge and when the tire is deflated.

In addition, if the tire must be inflated at a user's home or "on the road" in an emergency situation, a pressure gauge may be unavailable. In such a case, the tire must be inflated to an estimated pressure which may be quite different from the recommended amount, and damage may result to the tire during its subsequent use.

A double-acting pump is disclosed in Wickenberg et all. U.S. Pat. No. 3,485,180.

SUMMARY OF THE INVENTION

A principle feature of the present invention is the provision of a pump which may be utilized to determined the amount of pressure in a member being inflated by the pump.

The pump of the present invention includes an elongated hollow cylinder having a first closure adjacent one end of the cylinder and a second closure adjacent the other end of the cylinder, with the second closure having a bore extending therethrough. A piston is slidably received for reciprocation in the cylinder, with the piston separating the inside of the cylinder into a first chamber intermediate the piston and the first closure and a second chamber intermediate the piston and the second closure. The pump includes a hollow piston rod having one end connected to the piston and the other end extending out of the cylinder, with the rod being slidably received in the bore of the second closure. Means is provided for connecting the other end of the piston rod to an inflatable member. The pump has first one-way valve means adjacent the first closure for permitting passage of air from outside the cylinder into the first chamber, while preventing passage of air out of the first chamber. The pump also has second one-way valve means adjacent the second closure for permitting passage of air from outside the cylinder into the second chamber, while preventing passage of air out of the second chamber. Valve means is carried by the piston for establishing communication between either of the chambers and the piston rod when the pressure in either of the chambers exceeds pressure in the inflatable member and rod, in order that air is pumped into the inflatable member when the piston is reciprocated in the cylinder. The pump has opening means communicating between one of the chambers and the piston rod adjacent its one end for permitting relatively slow passage of air between the rod and the one chamber.

Thus, a feature of the present invention is that the location assumed by the cylinder relative the piston after urging of the piston toward the end of the one chamber and after release of the cylinder indicates the amount of pressure in the inflatable member.

A further feature of the invention is that the pressure may be determined by the pump without removal of the connecting means from the inflatable member.

In a preferred embodiment of the invention, the cylinder includes a transparent wall defining a longitudinal portion thereof. The cylinder may include pressure indicia spaced longitudinally along the wall.

Another feature of the invention is that the piston may be viewed through the transparent wall to determine the location of the piston.

Still another feature of the invention is that the indicia may be utilized to determine the pressure of the inflatable member as indicated by the location of the piston viewed through the wall.

In a preferred embodiment of the invention, the piston rod includes an outer thread adjacent its one end, and the piston includes an annular flange having an internal thread for securement of the piston to the rod.

Yet another feature of the invention is that the opening means comprises a tortuous groove between the threads of the piston and rod.

The connecting means may comprise a hose having one end for attachment to the inflatable member and the other end received in the piston rod. The hose is movable between a first position with a substantial portion of the hose withdrawn from the piston rod, and a second position with the hose substantially retracted into the piston rod. The piston rod defines a passageway extending from the piston to the outside of the pump, and frusto-conical seat is located in the passageway. The hose includes a frusto-conical enlarged portion adjacent its other end.

A feature of the invention is that the hose may be withdrawn from the piston rod to its first position for inflation of the inflatable member.

Another feature of the invention is that the enlarged portion of the hose engages against and seals with the seat when the hose is moved to its first position to prevent escape of air from the passageway during pumping.

A further feature is that the enlarged portion of the hose may be disenaged from the seat to deflate the inflatable member without removal of the inflatable member.

Yet another feature of the invention is that the hose may be moved to its second position with the hose substantially retracted into the piston rod for storage of the hose and pump.

Further features will become more fully apparent in the following description of the embodiment of this invention and from the appended claims.

DESCRIPTION OF THE DRAWINGS

In the drawings:

FIG. 1 is a fragmentary elevational view of one embodiment of the pump of the present invention;

FIG. 2 is a fragmentary sectional view of the pump of FIG. 1, showing a hose retracted into the pump for storage;

FIG. 3 is a fragmentary view, taken partly in section, of a handle portion of the pump of FIG. 1, showing the hose substantially withdrawn from the pump for use in inflating an inflatable member;

FIG. 4 is a fragmentary view, taken partly in section, of the pump of FIG. 3, showing the hose slightly retracted into the pump for deflation of the inflatable member;

FIG. 5 is a fragmentary sectional view on an enlarged scale showing one end of a cylinder in the pump of FIG. 1;

FIG. 6 is a fragmentary view on an enlarged scale and taken partly in section, showing a piston in the pump of FIG. 1;

FIG. 7 is a fragmentary sectional view of an enlarged scale, showing opening means in the pump of FIG. 6;

FIG. 8 is a fragmentary view on an enlarged scale and taken partly in section, showing the other end of the cylinder of the pump of FIG. 1;

FIG. 9 is a fragmentary view, taken partly in section, showing another embodiment of the pump of the present inventionl; and FIG. 10 is a fragmentary elevational view of the pump of FIG. 9.

DESCRIPTION OF THE PREFERRED EMBODIMENTS

Although the pumps of the present invention may be utilized to inflate any appropriate inflatable member, as desired, the pumps as described are particularly adapted for inflating a vehicle tire. In particular, the pump disclosed in connection with FIGS. 1–8 is particularly useful for inflating the tires of a smaller vehicle, such as a bicycle. As will be seen below, the pump described in connection with FIGS. 9 and 10 is very useful for inflating the tires of a larger vehicle, such as an automobile. However, as noted above, it will be understood that the pumps may be utilized for inflating any inflatable member by providing a suitable attachment for the pump to the inflatable member.

Referring now to FIGS. 1 and 2, there is shown a pump generally designated 20 having an elongated hollow cylinder 22 and a handle 24 to facilitate manipulation of the pump. The cylinder 22 has a first closure 26 adjacent one end 28 of the cylinder, and a second closure 30 adjacent the other end 32 of the cylinder 22, with the second closure 30 having a bore 34 extending therethrough.

In a preferred embodiment, the outer wall 36 of the cylinder 22 includes a longitudinally extending transparent wall portion 38, such as a clear plastic, for viewing of the inside of the cylinder. For convenience, the entire outer wall 36 of the cylinder 22 may be made of a transparent material to provide the transparent wall portion 38. The transparent wall portion 38 may include a plurality of pressure determining indicia 40 which are spaced longitudinally along the wall portion 38 for a purpose which will be described below.

The pump 20 includes a piston 42 which is slidably received inside the cylinder 22 for reciprocation therein. The piston divides the inside of the cylinder 22 into a first chamber 44 intermediate the piston 42 and the first closure 26 and a second chamber 46 intermediate the piston 42 and the second closure 30. An elongated hollow piston rod 48 has one end 50 connected to the piston 42, and the other end 52 extending out of the cylinder 22, with the rod 48 being slidably received in the bore 34 of the second closure 30. The handle 24 has an annular flange 54 which is secured to the other end 52 of the piston rod 48, and which defines an extension of a passageway 56 in the piston rod 48 to the outside of the pump 20. The pump 20 also includes a hose 58 made of flexible material, such as rubber, having an attachment member 59 adjacent one end 60 for attachment of the hose to the valve stem of a tire (not shown), and the other end 62 received in the passageway 56 of the piston rod 48. The hose 58 serves as means for connecting the piston rod 48 to the inflatable member or tire, as will be seen below.

As best shown in FIGS. 2 and 5, the first closure 26 may comprise an annular plug 64, having a threaded portion 66 which is engageable with an internal threaded portion 68 of the cylinder 22 for securement of the plug 64 onto the one end 28 of the cylinder 22. The plug 64 or first closure 26 has aperture means 70, such as a plurality of apertures, as shown, communicating between the inside and the outside of the cylinder 22. An annular flexible valve member 72 is secured to the inner end of the plug 64 by an annular flange 74 on the plug 64, which is received in a corresponding annular groove 76 in the valve member 72. The valve member 72 has an annular flexible lip 78 which is directed toward the first chamber 44 and which engages against the inside of the cylinder 22 to prevent passage of air from the first chamber 44 to the aperture means 70 and outside of the pump 20. However, the annular lip 78 flexes away from the inside of the cylinder 22 to permit passage of air from the aperture means 70 into the first chamber 44 when the pressure in the first chamber 44 is less than atmospheric pressure outside of the pump 20. Thus, the valve member 72 serves as a first one-way valve means for permitting passage of air from outside of the cylinder 22 into the first chamber 44, while preventing passage of air out of the first chamber 44. The plug 64 also has a recess 89 at its outer end for a purpose which will be described below.

Referring now to FIGS. 2 and 8, the second closure 30 may comprise an annular plug 80 having a threaded portion 82 which is engageable with an internal threaded portion 84 of the cylinder 22 for securement of the plug 80 to the other end 32 of the cylinder 22. The plug 80 or second closure 30 has aperture means 86, such as a plurality of apertures, as shown, communicating between the inside and the outside of the cylinder. An annular flexible valve member 88 is secured to the inner end of the plug 80 by an annular flange 90 on the plug 80 which is received in a corresponding annular groove 92 in the valve member 88. The valve member 88 has a first annular flexible lip 94 which is directed toward the second chamber 46 and which engages against the inside of the cylinder 22 to prevent passage of air from the second chamber 46 to the aperture means 86 and out of the pump 20. The first lip 94 flexes away from the inside of the cylinder 22 to permit passage of air from the aperture means 86 to the second chamber 46 when the pressure in the second chamber 46 is less than atmospheric pressure outside of the pump. Thus, the valve member 88 serves as a second one-way valve means for permitting passage of air from outside the cylinder into the second chamber 46, while preventing passage of air out of the second chamber.

As previously noted, the piston rod 48 is slidably received in a bore 34 extending through the second closure 30 or plug 80. the valve member 88 includes a second annular lip 96 which is directed toward the second chamber 46 and which prevents passage of air out of the second chamber 46 through the bore 34 between the plug 80 and the piston rod 48. As shown, the lips 94 and 96 define an annular recess 98 facing toward the second chamber 46, the purpose of which will be described below.

As best illustrated in FIGS. 2 and 6–8, the piston 42 includes an annular flange 100 having an internal threaded portion 102. The one end 50 of the piston rod 48 has an outer threaded portion 104 engageable with the threaded portion 102 of the flange 100 for securement of the piston rod 48 to the piston 42. As best shown in FIG. 7, the threaded portions 102 or 104 of either the flange 100 or piston rod 48 may have rounded or cut-off ends in order to define a tortuous passageway 106 between the threaded portions 102 and 104. In FIG. 7 the threaded portion 104 of the piston rod 48 is shown as having cutoff ends 108 to define the passageway 106, although it is understood that the threaded portion 102 of the flange 100 could have cut-off ends to produce the same results. The passageway 106 between the threaded portions 102 and 104 spirals around the piston rod 48, and communicates between the second chamber 46 and the inside of the piston rod 48. Thus, the passageway 106 permits a relatively slow passage of air between the piston rod 48 and the second chamber 46 due to the relatively small dimensions of the passageway 106 and the tortuous path defined by the passageway. The purpose for which the passageway is utilized will be described in detail below.

The piston 42 has an annular groove 110 and a plurality of passageways 112 communicating between the inside of the piston rod 48 and the inner end of the groove 110. The piston 42 carries an annular, flexible, V-shaped valve member 114 received in the groove 110. The valve member 114 has a pair of inner diverging lips 116a and 116b which converge toward an outer sealing ring 118. The lips 116a and b releasably engage against and seal with the side walls of the groove 110, and thus cover the passageways 112. The ring 118 engages against and seals with the inside of the cylinder 22 to prevent passage of air between the first and second chambers 44 and 46.

Once the hose 58 is connected to the tire, if the pressure in the first chamber 44 exceeds the pressure inside the piston rod 48 and the connected tire, the lip 116b of the valve member 114 flexes away from the side wall of the groove 110 to permit passage of air from the first chamber 44 through the piston rod 48 to the tire. However, when the pressure inside the tire and piston rod 48 exceeds the pressure in the first chamber 44, the lip 116b seals against the side wall of the groove 110 and prevents passage of air from the tire back into the first chamber 44. Similarly, when the pressure in the second chamber 46 exceeds the pressure inside the piston rod 48 and the connected tire, the lip 116a of the valve member 114 flexes away from the side wall of the groove 110 to permit passage of air from the second chamber 46 through the piston rod 48 to the tire. If the pressure in the tire and the piston rod 48 exceeds the pressure in the second chamber 46, the lip 116a seals against the side wall of the groove 110 to prevent passage of air from the tire and piston rod 48 to the second chamber 46. Thus, the valve member 114 serves as valve means carried by the piston for establishing communication between either of the chambers 44 or 46 and the piston rod 48 when the pressure in either of the chambers exceeds the pressure in the piston rod and tire. The use of the piston 42 and valve member 114 for pumping air into the tire will be described in detail below.

The flange 100 of the piston 42 preferably includes an annular extension 120 which is spaced from the piston rod 48 and which is directed toward the second closure 30. As best shown in FIG. 8, when the piston 42 nears the valve member 88 associated with the second closure 30, the extension 120 is received in the recess 98 between the lips 94 and 96 of the valve member 88. The extension 120 abuts against the connecting portion of the valve member 88 between the lips 94 and 96 to prevent damage to the lips by the piston.

The operation of the hose 58 is best described in connection with FIGS. 2–4. The annular flange 54 of the handle 24 has a frustro-conical valve seat 122 adjacent the other end 52 of the piston rod 48. The hose 58 has an enlarged portion 124 of frustro-conical shape adjacent its other end 62. The shape of the enlarged portion 124 may be defined by a rigid insert 126 of frustro-conical shape which is received in the other end 62 of the hose 58, as shown in FIG. 2.

The hose 58 is movable between a first position with a substantial portion of the hose withdrawn from the piston rod, as shown in FIG. 3, and a second position with a substantial portion of the hose retracted into the piston rod, as shown in FIG. 2. When the hose 58 is moved to its first position, as shown in FIG. 3, the enlarged portion 124 sealingly engages against the seat 122 to prevent the escape of air from the passageway 56 of the piston rod 48. Thus, the hose 58 is located in its first position when it is desired to inflate the tire.

As best illustrated in FIG. 4, the outside diameter of the hose 58 adjacent the enlarged portion 124 is slightly less than the inside diameter of the seat 122, and the ouside diameter of the enlarged portion 124 is less than the inside diameter of the passageway 56. Thus, when it is desired to deflate the inflated tire, the enlarged portion 124 of the hose 58 is disengaged slightly from the seal 122 to permit passage of air from the hose to the outside of the pump through the space between the seat 122 and the hose, as indicated by the direction of the arrows in FIG. 4. The release of air from the tire is thus accomplished without removal of the attachment member 59 from the valve stem of the tire. When the tire has been deflated a desired amount, the enlarged portion 124 is again sealingly engaged against the seat 122 to prevent the further escape of air from the tire, as shown in FIG. 3. When it is desired to store the pump, the attachment member 59 of the hose 58 is removed from the valve stem of the tire, and the hose is moved to its second position retracted into the pump, as illustrated in FIG. 2.

The use of the pump for inflating a tire is described as follows. The hose 58 is first moved from its second storage position to its first operating position, as shown in FIG. 3, until the enlarged portion 124 of the hose engages against and seals with the seat 122. The attachment member 59 of the hose 58 is then threaded onto the valve stem of the tire. Next, the handle 24 and cylinder 22 are grasped and pumped by the user's hands to reciprocate the piston 42 in the cylinder 22.

As the piston 42 moves toward the first closure 26 a vacuum is created in the second chamber 46. Accordingly, air passes from the outside of the pump through the aperture means 86 of the second closure 30 and past the lip 94 of the valve member 88 into the second chamber 46. If the pressure in the tire is greater than atmospheric pressure, the valve member 114 will prevent passage of air between the tire and second chamber. In addition, air is compressed in the first chamber 44 as long as the pressure in the tire is greater than the pressure in the first chamber, since the valve member 72 prevents passage of air from the first chamber 44 out of the pump and the valve member 114 prevents passage of air from the first chamber to the tire. When the pressure in the first chamber 44 exceeds the pressure in the tire and the inside of the piston rod 48, the lip 116b of the valve member 114 flexes away from the side wall of the groove 110 in the piston to permit passage of air from the first chamber 44 through the piston rod 48 and into the tire. The lip 116a of the valve member 114 remains sealed against the sidewall of the groove 110, since the pressure in the first chamber 44 and piston rod 48 exceeds the pressure in the second chamber 46. This condition continues until the piston 42 nears the first closure 26, such that air is continuously pumped from the first chamber 44 into the tire.

When the piston 42 is moved toward the second closure 30 a vacuum is created in the first chamber 44. Accordingly, air is permitted to pass from the outside of the pump into the first chamber 44 around the lip 78 of the valve member 72, while air is prevented from passing between the tire and first chamber 44 by the valve member 114. As long as the pressure in the tire is greater than the pressure in the second chamber, air will be compressed in the second chamber because the valve members 88 and 114 prevent passage of air out of the second chamber. However, when the pressure in the second chamber exceeds the pressure in the tire as the air is compressed, the lip 116a of the valve member 114 flexes away from the sidewall of the groove 110, and air passes from the second chamber 46 through the piston rod 48 into the tire. The lip 116b of the valve member 114 remains sealed against the sidewall of the groove 110 to prevent passage of air from the piston rod into the first chamber 44. This condition continues until the piston 42 nears the second closure 30, such that air is continuously pumped from the second chamber 46 into the tire.

Thus, the pump 20 of the present invention pumps air into the tire as the piston 42 is reciprocated relative the cylinder 22 in both directions, and the pump inflates the tire irrespective of which direction pumping takes place.

When it is desired to determine the pressure in the tire, the piston 42 is moved to a position adjacent the valve member 88, as shown in FIG. 8. Since air has passed from outside the pump into the first chamber 44 during movement of the piston toward the valve member 88, the pressure in the first chamber 44 is nearly atmospheric, and the first chamber in this configuration of the pump has a fixed volume. If the pressure in the tire is greater than atmospheric, the piston 42 will move toward the first closure 26 when the cylinder 22 is released by the user. This follows since air is permitted to pass from the tire to the second chamber through the passageway 106, and the pressure in the second chamber 46 is greater than the pressure in the first chamber 44. It is apparent that air will be compressed in the first chamber 44 during movement of the piston toward the first closure 26, since the valve members 72 and 114 prevent passage of air out of the first chamber. Movement of the piston toward the first closure continues until the following condition of equilibrium is satisfied:

$$P_1 A_1 = P_2 A_2,$$

where,
$P_1 =$ the pressure of the compressed air in the first chamber,
$A_1 =$ the area of a cross-section through the first chamber,
$P_2 =$ the pressure in the second chamber and tire, and
$A_2 =$ the area of a cross-section through the second chamber, less the area of a cross-section through the wall of the piston rod.

The variable distance which the piston travels from the second closure toward the first closure will, of course, be determined by the pressure in the tire, since the first chamber has a fixed volume and pressure when the piston is located adjacent the second closure, as noted above.

Accordingly, the location assumed by the cylinder 22 relative the piston 42 is indicative of the amount of pressure in the tire. Since the piston 42 is visible through the transparent wall portion 38 of the cylinder 22, as shown in FIG. 1, the piston 42 or part thereof may be used as a pointer in conjunction with pre-calibrated indicia 40 on the cylinder to determine the pressure in the tire. If desired, the indicia 40 may be calibrated to use the valve member 114 of the piston 42 as an indicator to determine the amount of pressure in the tire. In the example shown in FIG. 1, the valve member 114 of the piston 42 indicates that a pressure value of 60 is present in the tire.

It is noted at this point that passage of air between the second chamber 46 and the piston rod 48 through the passageway 106 is sufficiently slow to prevent impairment of the normal pumping operation, while sufficient passage of air through the passageway 106 is permitted to obtain a relatively quick reading of the tire pressure. Although the passageway 106 has been shown as communicating between the second chamber 46 and the piston rod 48, it is apparent that the passageway could be connected between the first chamber and the piston rod with equally beneficial results. In such a case, the piston 42 would be moved toward the first closure 26 prior to release of the cylinder to obtain a pressure reading, and the indicia 40 must be calibrated accordingly.

Thus, a pump according to the present invention has been described which inflates the inflatable member or tire irrespective of which direction the cylinder 22 is moved relative the piston 42. Also, the pump of the present invention may be utilized to determine the pressure in the tire, as described above, in order to determine whether the pumping operation should continue. If the tire has been inadvertently overinflated, the enlarged portion 124 of the hose 58 may be slightly disengaged from the valve seat 122 to deflate the tire a desired amount.

As discussed above, the pump disclosed in connection with FIGS. 1–8 is particularly adapted for inflating a relatively small tire, such as a bicycle tire. Accordingly, the pump is also constructed for convenient storage of the pump between a pair of spaced fixtures (not shown) on a bicycle. For storage, the hose 58 is moved to its retracted position in the piston rod 48, and the cylinder 22 is moved toward the hand 24, as best shown in FIG. 2. The pump 20 has a helical spring 128 extending from the annular flange 54 of the handle 24 toward the second closure 30, with the spring 128 extending around a longitudinal portion of the piston rod 48. As the cylinder 22 is moved toward the handle 24, the spring is compressed between the handle 24 and the second closure 30. The pump 20 may be positioned between the spaced fixtures on the bicycle with the spring 128 compressed, and the cylinder 22 may be released by the user to permit the spring 128 to move the cylinder 22 away from the handle 24, such that one fixture is received in the recess 89 of the first closure 26 and the other fixture is received in the attachment member 59 of the hose 58. Accordingly, the pump is retained between the fixtures on the bicycle for future use.

Another embodiment of the invention, which is particularly adapted for inflating an automobile tire or the like, is illustrated in FIGS. 9 and 10. The pump of FIGS. 9 and 10 is similar in structure and operation to the pump described in connection with FIGS. 18, and like reference numerals will be utilized in FIGS. 9 and 10 to designate like parts.

The pump 20 of FIGS. 9 and 10 has a handle 130 secured to the first closure 26 by any suitable means, such as a threaded bolt 132 depending from the handle 130 which is threaded into an internally threaded projection 134 extending from the first closure 26, as shown in FIG. 9. In this embodiment, the other end 52 of the piston rod 48 is threaded, and a foot member 136 having a pair of lower opposed flanges 138a and 138b is secured to the other end 52 of the piston rod 48 by a pair of threaded bolts 140a and 140b, as shown. In this embodiment of the invention, the other end 62 of the hose 58 is secured directly to the other end 52 of the piston rod 48 by an annular flange 142 which is pressed over the other end 62 of the hoses to engage the hose between the flange 142 and threads of the piston rod.

In use of the pump of FIGS. 9 and 10, the user's feet are placed over the opposed flanges 138a and b of the foot member 136 to anchor the pump to the ground, while the piston 42 is reciprocated in the cylinder 22 by grasping and moving the handle 130. In other respects, the operation of the pump is similar to that described in connection with the pump of FIG. 18. In particular, air is pumped from both chambers of the cylinder, and the pressure of the tire may be determined by the pump, as described above.

The foregoing detailed description is given for clearness of understanding only, and no unnecessary limitations should be understood therefrom as modifications will be obvious to those skilled in the art.

What is claimed is:

1. A pump for inflating an inflatable member, comprising:
   an elongated hollow cylinder having a first closure adjacent one end of the cylinder and a second closure adjacent the other end of the cylinder, said second closure having a bore extending therethrough;
   a piston slidably received for reciprocation in said cylinder, said piston separating the inside of the cylinder into a first chamber intermediate the piston and the first closure and a second chamber intermediate the piston and the second closure;
   a hollow piston rod having one end connected to the piston and the other end extending out of the cylinder, said rod being slidably received in the bore of the second closure;
   means for connecting the other end of the rod to the inflatable member;
   first one-way valve means adjacent the first closure for permitting passage of air from outside the cylinder into the first chamber and preventing passage of air out of the first chamber;
   second one-way valve means adjacent the second closure for permitting passage of air from outside the cylinder into the second chamber and preventing passage of air out of the second chamber;
   valve means carried by the piston for establishing communication between either of said chambers and the piston rod when the pressure in either of said chambers exceeds the pressure in the inflatable member, whereby air is pumped into the inflatable member when the piston is reciprocated in the cylinder;
   opening means communicating between one of said chambers and the piston rod adjacent its one end for permitting relatively slow passage of air between the rod and one chamber; and
   means operatively coupled to the piston and the cylinder to indicate the location assumed by the cylinder relative the piston after movement of the piston toward the end of said one chamber and after release of the cylinder measuring the amount of pressure in the inflatable member.

2. The pump of claim 1 wherein said cylinder includes pressure indicia spaced longitudinally along the wall for determining the pressure as indicated by the location of the piston viewed through the wall.

3. The pump of claim 1 wherein said first closure includes aperture means communicating between the inside and the outside of the cylinder, and said first one-way valve means comprises a valve member positioned intermediate the aperture means and the first chamber, said valve member having an annular flexible lip directed toward the first chamber and engaging against the inside of the cylinder to prevent the passage of air from the first chamber to the aperture means, said lip flexing away from the cylinder to permit passage of air from the aperture means into the first chamber.

4. The pump of claim 1 including a handle secured to the cylinder adjacaent the first closure, and a foot member having opposed flanges and being secured to the other end of the piston rod, said handle and foot member facilitating manipulation of the pump for reciprocating the piston in the cylinder.

5. The pump of claim 1 wherein said piston includes an annular groove and passageway means communicating between said groove and the piston rod, and wherein the piston valve means comprises an annular, flexible, member of V-shaped section having a pair of inner diverging lips which converge toward an outer sealing ring, said member being received in said groove with the lips covering the passageway means and releasably engaging against and sealing with the walls of said groove, and with said ring engaging against and sealing with the inside of said cylinder.

6. The pump of claim 1 wherein said cylinder includes a transparent wall defining a longitudinal portion thereof for viewing said piston through the wall.

7. The pump of claim 6 wherein said cylinder has a transparent wall.

8. The pump of claim 1 wherein said opening means communicates between the piston rod and said second chamber.

9. The pump of claim 8 wherein said piston rod includes an outer thread adjacent its one end, said piston including an annular flange having an internal thread for securement of the piston on the rod, and said opening means comprises a tortuous groove between the threads of the piston and rod.

10. The pump of claim 1 wherein said opening means comprises a narrow passageway extending between said one chamber and said piston rod.

11. The pump of claim 10 wherein said passageway defines a tortuous path.

12. The pump of claim 1 wherein said second closure includes aperture means communicating between the inside and outside of the cylinder, and second one-way valve means comprises a valve member positioned intermediate the aperture means and the second chamber, said valve member having an annular flexible lip directed toward the second chamber and engaging against the inside of the cylinder to prevent the passage of air from the second chamber to the aperture means, with said lip flexing away from the cylinder to permit passage of air from the aperture means into the second chamber.

13. The pump of claim 12 wherein said valve member includes an annular flexible lip directed toward the second chamber and engaging against the piston rod to prevent escape of air from the second chamber.

14. The pump of claim 1 including a handle secured to the other end of the piston rod to facilitate manipulation of the pump for reciprocating the piston in the cylinder.

15. The pump of claim 14 including a helical spring extending from the handle toward the second closure around the piston rod, said spring engaging against the second closure when the second closure is positioned adjacent the handle to bias the handle away from the cylinder and facilitate attachment of the pump to a fixture for storage.

16. The pump of claim 1 wherein the connecting means comprises, a hose having one end for attachment to the inflatable member and the other end received in the piston rod, said hose being movable between a first position with a substantial portion of the hose withdrawn from the piston rod for inflation of the inflatable member, and a second position with the hose substantially retracted into the piston rod for storage of the pump.

17. The pump of claim 16 wherein said piston rod and pump define a passageway extending from the piston to the outside of the pump, including a frusto-conical seat in said passageway, and in which the hose includes a frustro-conical enlarged portion adjacent its other end to engage against and seal with said seat when the hose is moved to its first position.

18. The pump of claim 17 wherein the outside diameter of said hose adjacent said enlarged portion is slightly less than the inside diameter of said seat, and the outside diameter of the enlarged portion is less than the inside diameter of the passageway, whereby the inflatable member may be deflated by disengaging said enlarged portion from the seat.

19. The pump of claim 18 wherein said seat is located adjacent the other end of the piston rod.

20. A pump for inflating an inflatable member, comprising:

an elongated hollow cylinder having a first closure adjacent one end of the cylinder and a second closure adjacent the other end of the cylinder, said second closure having a bore extending therethrough;

a hollow piston rod slidably received in the bore of the second closure;

a piston having a peripheral edge with a greater diameter than said piston rod and slidably received for reciprocation in said cylinder and being connected to one end of the piston rod with the other end of the piston rod extending out of the cylinder, said piston separating the inside of the cylinder into a first chamber intermediate the piston and the first closure and a second chamber intermediate the piston and the second closure, said piston including an annular groove extending from said peripheral edge to passageway means communicating between said groove and the piston rod;

said passageway means extending through said piston at a position substantially corresponding to the diameter of the piston rod;

means for connecting the other end of the piston rod to the inflatable member;

first one-way valve means adjacent the first closure for permitting passage of air from outside the cylinder into the first chamber and preventing passage of air out of the first chamber;

second one-way valve means adjacent the second closure for permitting passage of air from outside the cylinder into the second chamber and preventing passage of air out of the second chamber; and valve means carried by the piston for establishing communication between either of said chamber and the piston rod when the pressure in either of said chambers exceeds the pressure in the inflatable member, whereby air is pumped into the inflatable member when the piston is reciprocated in the cylinder, the piston valve means comprising an annular, flexible member of V-shaped section having a pair of inner diverging lips which converge toward an outer sealing ring, said member being received in said groove with the lips covering the passageway means at a point adjacent thereto and releasably engaging against and sealing with the walls of said groove, and with said ring engaging against and sealing with the inside of said cylinder.

* * * * *

UNITED STATES PATENT OFFICE
CERTIFICATE OF CORRECTION

Patent No. 3,981,625                  Dated September 21, 1976

Inventor(s) Chester H. Wickenberg

It is certified that error appears in the above-identified patent and that said Letters Patent are hereby corrected as shown below:

Column 1, line 54, "all" should read --- al. ---.

Column 3, line 5, after "the" should read --- hose from the ---.

Column 3, line 44, "invention1;" should read --- invention; ---.

Column 5, line 20, "the" should read --- The ---.

Column 6, line 62, "seal" should read --- seat ---.

Column 9, line 22, "hand" should read --- handle ---.

Column 9, line 59, "hoses" should read --- hose ---.

Signed and Sealed this

Fifteenth Day of August 1978

[SEAL]

Attest:

RUTH C. MASON
*Attesting Officer*

DONALD W. BANNER
*Commissioner of Patents and Trademarks*